United States Patent [19]

Blount

[11] 4,357,429
[45] Nov. 2, 1982

[54] PROCESS FOR THE PRODUCTION OF ALKALI METAL SILICATE-ORGANIC PLASTICS

[76] Inventor: David H. Blount, 5450 Lea St., San Diego, Calif. 92105

[21] Appl. No.: 359,917

[22] Filed: Mar. 19, 1982

Related U.S. Application Data

[60] Division of Ser. No. 284,486, Jul. 17, 1981, Pat. No. 4,332,712, which is a continuation-in-part of Ser. No. 233,151, Feb. 10, 1981, Pat. No. 4,303,768, which is a continuation-in-part of Ser. No. 146,474, May 5, 1980, Pat. No. 4,273,908, which is a continuation-in-part of Ser. No. 036,350, May 7, 1979, abandoned, which is a continuation-in-part of Ser. No. 889,932, Mar. 27, 1978, abandoned, which is a continuation-in-part of Ser. No. 663,924, Mar. 4, 1976, Pat. No. 4,097,424, which is a continuation-in-part of Ser. No. 599,000, Jul. 7, 1975, Pat. No. 4,072,637, which is a continuation-in-part of Ser. No. 262,485, Jun. 14, 1972, abandoned, which is a continuation-in-part of Ser. No. 71,628, Sep. 11, 1970, abandoned.

[51] Int. Cl.$^3$ .............................. C08J 9/04; C08J 3/06

[52] U.S. Cl. ................................. 521/100; 521/122; 521/137; 521/154; 524/650; 524/788; 524/846; 528/362; 528/421

[58] Field of Search ...................... 524/650, 788, 846; 521/100, 122, 137, 154; 528/362, 421

[56] References Cited

U.S. PATENT DOCUMENTS

| | | | |
|---|---|---|---|
| 4,170,697 | 4/1979 | Blount | 521/82 |
| 4,200,697 | 4/1980 | Blount | 521/83 |
| 4,256,873 | 3/1981 | Blount | 528/425 |
| 4,303,768 | 6/1982 | Blount | 524/650 |
| 4,303,768 | 12/1981 | Blount | 521/83 |
| 4,332,712 | 6/1982 | Blount | 524/650 |

*Primary Examiner*—Morton Foelak

[57] ABSTRACT

Polymerable organic compounds and an epoxide compound are emulsified with aqueous alkali metal silicate solutions then polymerized with a catalyst such as a peroxide type catalyst thereby producing an alkali metal silicate organic plastic which may be used as an adhesive, as molding powder or reacted with an organic diisocyanide to produce polyurethane silicate resins and foams.

22 Claims, No Drawings

PROCESS FOR THE PRODUCTION OF ALKALI METAL SILICATE-ORGANIC PLASTICS

CROSS-REFERENCE TO RELATED APPLICATIONS

This application is a divisional of U.S. patent application Ser. No. 284,486 filed on July 17, 1981 now U.S. Pat. No. 4,332,712, which is a continuation-in-part of U.S. patent application Ser. No. 233,151 filed Feb. 10, 1981, now U.S. Pat. No. 4,303,768, which is a continuation-in-part of U.S. patent application Ser. No. 146,474 filed May 5, 1980, now U.S. Pat. No. 4,273,908, which is a continuation-in-part of my U.S. patent application Ser. No. 036,350, filed May 7, 1979, now abandoned, which is a continuation-in-part of my U.S. patent application Ser. No. 889,932, filed Mar. 27, 1978, now abandoned which is a continuation-in-part of my earlier U.S. patent application Ser. No. 663,924, filed Mar. 4, 1976, now U.S. Pat. No. 4,097,424, which is a continuation-in-part of my earlier U.S. patent application Ser. No. 599,000, filed July 7, 1975, now U.S. Pat. No. 4,072,637, which is a continuation-in-part of my earlier U.S. patent application Ser. No. 262,485, filed June 14, 1972, now abandoned, which is a continuation-in-part of my earlier U.S. patent application Ser. No. 71,628, filed Sept. 11, 1970, now abandoned.

BACKGROUND OF THE INVENTION

This invention relates to a process for the production of alkali metal silicate organic plastics by emulsifying a polymerable unsaturated organic compound and an organic epoxide compound with an aqueous alkali metal solution by mixing the polymerable organic compound and an organic epoxide compound with an aqueous solution of alkali metal silicate then adding a salt-forming compound in the amount up to 10%, based on the alkali metal silicate, preferably an organic acid, while agitating thereby producing a stable emulsion. A polymerizing catalyst such as a peroxide type catalyst is added to the emulsion thereby producing a poly(alkali metal silicate-polymerable organic compound epoxide compound) copolymer. In most products an excess amount of the aqueous alkali metal silicate may be used. The inorganic-organic plastic produced by the process of this invention has greatly improved flame resistance properties.

The polymerization of an alkali metal silicate with a polymerable unsaturated organic compound was illustrated in U.S. patent application Ser. No. 71,628, filed Sept. 11, 1970, by David H. Blount. The alkali metal silicate is oxidized by a peroxide initiator then polymerized with a polymerable organic compound. I have discovered that a stable emulsion of an aqueous alkali metal silicate and a polymerable unsaturated organic compound may be produced by adding up to 10% by weight, percentage based on weight of the aqueous alkali metal silicate solution, of a salt forming compound, and mixing with the mixture of the aqueous alkali metal silicate and polymerable compound. This stable emulsion greatly enhances the reaction between the alkali metal silicate and polymerable organic compound. Any suitable polymerable unsaturated organic compound may be used in this invention that can be polymerized in an aqueous alkali metal silicate solution in the presence of a peroxide initiator.

The emulsions of inorganic-organic plastics may be used as an adhesive on wood, paper, cement, plastics, ceramics, etc., as a coating agent on wood, cement, plastics, ceramics, etc., and may be dried or coagulated with a salt forming compound to produce a molding powder which may be molded by heat and pressure to produce useful objects such as knobs, handles, gears, pipes, toys, etc. The emulsion of inorganic-organic plastics may be further reacted with organic compounds such as polyisocyanates, isocyanates, epoxide compounds, substituted organic compounds, water-binding agents and many other compounds. The emulsion of inorganic-organic plastics may be used as a cavity filler, as putty, as a caulking compound, and in producing laminates.

It is accordingly, an object of my invention to provide novel inorganic-organic copolymers. A further object is to provide novel copolymers which may be used as an adhesive. A further object is to provide novel copolymers that will react with polyisocyanates to produce useful resinous and foam products. A further object is to provide a process for preparing novel inorganic-organic copolymers. Another object is to produce emulsions of inorganic-organic copolymers which may be used to produce concrete reinforced and reacted with inorganic-organic copolymers.

The inorganic-organic plastics may be produced by emulsifying and reacting the following components:
Component (a) an aqueous alkali metal silicate solution;
Component (b) a polymerable unsaturated organic compound;
Component (c) a salt forming compound;
Component (d) an initiator
Component (e) an epoxide compound

Component (a)

Any suitable alkali metal silicate may be used in this invention. Suitable alkali metal silicates include sodium, potassium and lithium silicates. The alkali metal silicates are preferred to be in an aqueous solution. Concentration of 10% to 70% of alkali metal silicates in an aqueous solution or an alkali metal metasilicate pentahydrate which has been melted to produce an aqueous solution. The weight ratio of $SiO_2$:NaO may vary greatly from 3.75:1 to 1:2. Sodium silicate is the preferred alkali metal silicate.

Component (b)

Any suitable polymerable unsaturated organic compound may be used in this invention. Suitable polymerable unsaturated organic compounds include but not limited to vinyl monomers, organic dienes, allyl compounds, unsaturated aliphatic hydrocarbon compounds unsaturated fluorocarbon compounds and mixtures thereof.

Suitable vinyl monomers include styrene, vinyl acetate acrylates, vinyl chloride, vinylidine chloride, acrylonitrile, vinyl toluenes, N-vinyl carbazole, vinyl pyrovidone, vinylidine cyanide, alkyl vinyl ketones, aryl vinyl ketones, methacrylonitrile and mixtures thereof.

Suitable organic dienes include isoprene, chloroprene, butadiene and mixtures thereof.

Suitable allyl compounds include allyl alcohol, methallyl alcohol, phenallyl alcohol, 3-chloropropene, 3-bromopropene, methallyl chloride and mixtures thereof.

Suitable aliphatic hydrocarbon compound include ethylene, propylene and mixtures thereof.

Suitable acrylate compounds include but are not limited to methyl methacrylate, methyl acrylate, ethyl acrylate, propyl acrylate, butyl acrylate, pentadecyl acrylate, hexadecyl acrylate, benzyl acrylate, cyclohexyl acrylate, phenyl ethyl acrylate, ethyl methacrylate, methyl-chloroacrylate, 2-chloroethyl acrylate, 1,1-dihydroperfluorobutyl acrylate, lauryl acrylate, cyclohexylcyclohexyl methacrylate, allyl methacrylate and mixtures thereof. Acrylic acid compounds which have been reacted with an alkali compound may be used in this invention.

Any suitable allyl halide compound having the general formula:

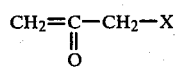

wherein R is a hydrogen or a $C_1$ to $C_4$ alkyl group and x represents a halogen atom may be used in this invention. Furthermore, these compounds contain one olefinic group of which one unsaturated carbon atom contains at least one hydrogen atom per molecule.

Any suitable allyl-type alcohol having the general structure formula:

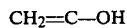

may be used in this invention.

Styrene is the preferred polymerable unsaturated organic compound.

Component (c)

Any suitable salt forming compound may be used in this invention, such as aliphatic carboxylic acids, aliphatic acid anhydrides, aliphatic polycarboxylic acids, cycloaliphatic carboxylic acids, cycloaliphatic polycarboxylic acids, aromatic carboxylic acid, aromatic polycarboxylic acids, heterocyclic polycarboxylic acids, aliphatic carboxylic acid anhydrides, aromatic carboxylic acid anhydrides and mixtures thereof. The organic acids may be substituted, e.g. with halogen atoms and may be unsaturated.

Organic polycarboxylic acids are preferred. Adipic acid is the preferred polycarboxylic acid. It is preferred to use the organic mono-carboxylic acids with polycarboxylic acids.

Examples of suitable aliphatic acids are, but are not limited to, acetic acid, propionic acid, formic acid, butyric acid, valeric acid, caproic acid, undecanoic acid, palmitic acid, stearic acid, acrylic acid, etc.

An example of suitable aliphatic acid anhydrides is acetic anhydride, but examples are not limited to that.

Examples of suitable aromatic acids are, but are not limited to, benzoic acid, para-aminobenzoic acid, alicylic acid, methyl salicylates, etc.

The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterephthalate and bisglycol terephthalates.

Component (d)

Any suitable organic epoxide compound may be used in this invention. Suitable epoxide compound include ethylene oxide, propylene oxide, butylene oxide, tetrahydrofuran, styrene oxide, trichlorobutylene oxide, epihalohydrins such as epichlorohydrin, epibromohydrin and the like.

Ethylene oxide and propylene oxide and mixtures thereof are the preferred organic epoxide compounds. Starting components which contain reactive hydrogen atoms such as alcohols, e.g., ethylene glycol, propylene-1,3- and -1,2-glycol, trimethylolpropane, 4,4' dihydroxydiphenylpropane, ammonia, ethanolamine, amines, e.g., aniline, ammonia, ethanolamine or ethylenediamine, carbohydrates, e.g., sucrose, dextrose or glucose, may be added to the aqueous alkali metal silicate in an amount up to 10% by weight, percentage based on the reactants, (a), (b), (c) and (d).

Suitable epoxide catalyst may be used with the epoxide compounds such as e.g. organic amines, $BF_3$ and the like.

Component (e)

Suitable initiators include but are not limited to organic and inorganic peroxides, alkali metal persulfates, ammonium persulfate, redox systems, aliphatic azo compounds, organic and inorganic peroxide with organic and inorganic metal compounds. Suitable peroxide initiators include but are not limited to hydrogen peroxide and acyl or aryl peroxides such as p-menthane hydroperoxide, ethyl ketone peroxide, benzoyl peroxide, acetyl benzyl peroxide, p-chlorobenzoyl peroxide, alkoxy benzoyl peroxide, lauroryl peroxide, dibutyryl peroxide, dicaproyl peroxide, crotonyl peroxide, di-tert-alkyl peroxide, methyl amyl ketone peroxide, di-tert-butyl disphosphate peroxide, peracetic acid, cyclohexyl hypoperoxide and mixtures thereof. Suitable alkali metal persulfates include ammonium persulfate, potassium persulfate and sodium persulfate. Any suitable commonly known redox systems as known in the arts may be used. Other initiator systems may be used such as peroxides with metal compounds as activators such as ethyl ketone peroxide with cobalt naphthenate, potassium persulfate with ferric sulfate or cupric sulfate (0.001 to 0.002 parts by weight per part by weight of the polymerable compound) and benzoyl peroxide with a tertiary amine activator, such as N,N-dimethyl aniline. The amount of the peroxide initiator needed is quite varied and usually a catalytic amount is sufficient, but may be added up to 0.5% based on the reaction mixture.

The polymerization may also be initiated by heat or photosensitizers such as benzoin, biacetyl, etc., alone or with other initiators in certain reaction.

Surface-active additives (emulsifiers and foam stabilizers) may also be used according to the invention. Suitable emulsifiers are, e.g., the sodium salt of ricinoleic sulphonates or of fatty acids or salts of fatty acids with amines, e.g., oleic acid diethylamine or stearic acid diethanolamine. The commercially available soaps and detergents may be used. Other surface-active additives are alkali metal or ammonium salts or sulphonic acids, e.g., dodecylbenzene sulphonic acid or dinaphthyl methane disulphonic acids or fatty acids, e.g., ricinoleic acid, or of polymeric fatty acids. Surfactants such as sodium dioctyl sulfosuccinate, potassium dioctyl sulfosuccinate and dioctyl calcium sulfosuccinate may also be used.

The foam stabilizers used are mainly water-soluble polyester siloxanes. These compounds generally have a polydimethylsiloxane group attached to a copolymer of ethylene oxide and propylene oxide. Foam stabilizers of this kind have been described, e.g., in U.S. Pat. No. 3,629,308. These additives are, preferably, used in quantities of from up to 20%, based on the reaction mixture.

Further examples of surface-active additives, foam stabilizers, cell regulators, stabilizers, flame-retarding substances, plasticizers, dyes, fillers and fungicidal and bacteriocidal substances which are utilized for polyurethane foams, but may also be used in this invention, may be found in Kunststoff-Handbuch, Volume VI; published by Vieweg and Hochtlen, Carl-Hanser-Verlag, Munich, 1966, e.g., on pages 103 to 113. The halogenated paraffins and inorganic salts of phosphoric acid are the preferred fire-retardant agents.

SUMMARY OF THE INVENTION

The process for the production of alkali metal silicate organic plastic products is simple. It is merely necessary for the components to come together; for example, a polymerable unsaturated compound, an organic epoxide compound, an aqueous alkali metal silicate, up to 10% by weight of a salt forming compound, percentage based on the weight of the alkali metal silicate, and a suitable initiator.

The chemical reaction of this invention may take place in any suitable physical condition. Ambient pressure is usually satisfactory, but in certain conditions, an elevated or below ambient pressure may be useful. In cases where the polymerable unsaturated compound is a gas it is usually necessary to increase the pressure until the gas is in a liquid state or decrease the temperature until the gas is in a liquid state or use a combination of elevated pressure and decreased temperature. The reactants may be mixed in any suitable manner at any suitable temperature or pressure.

The preferred method to produce an emulsion of poly(alkali metal silicate-polymerable unsaturated organic compound-epoxide) copolymer is to thoroughly mix an aqueous alkali metal silicate solution in the amount of 100 parts by weight, a polymerable unsaturated organic compound in the amount of 5 to 100 parts by weight, an epoxide compound in the amount of 1 to 100 parts by weight, a salt forming compound in the amount of up to 10 parts by weight and a catalytic amount of an initiator to form a stable emulsion then allow the mixture to react for 1 to 24 hours at any suitable temperature and pressure.

In an alternate method the aqueous alkali metal solution, salt forming compound initiator and optional emulsifiers, foam regulators and fillers are thoroughly mixed then the polymerable unsaturated organic compound and epoxide compound are added at a suitable temperature and pressure while agitating. The mixture is then allowed to react for 1 to 24 hours thereby producing an emulsion of poly(alkali metal silicate-polymerable unsaturated organic compound-epoxide) copolymer.

The copolymer produced by this invention may be used as a coating agent, as impregnants, as adhesives for wood, paper, etc., may be molded into useful products such as rods, sheets, blocks, etc., may be further reacted with polyisocyanates and used as a reinforcement for water binding compounds such as Portland cement.

Any suitable organic polyisocyanate may be used according to the invention, including aliphatic, cycloaliphatic, araliphatic, aromatic, heterocyclic polyisocyanates and mixtures thereof. Suitable polyisocyanates which may be in the process of the invention are exemplified by the organic diisocyanates which are compounds of the general formula:

$$O=C=N-R-N=C=O$$

wherein R is a divalent organic radical such as an alkylene, aralkylene or arylene. Examples of such diisocyanates are:
p,p'-diphenylmethane diisocyanate
phenylene diisocyanate
chlorophenylene diisocyanate
tolylene diisocyanate
m-xylylene diisocyanate
benzidine diisocyanate
naphthylene diisocyanate
tetramethylene diisocyanate
pentamethylene diisocyanate
hexamethylene diisocyanate
decamethylene diisocyanate
thiodipropyl diisocyanate Other polyisocyanates, polyisothiocyanates and their derivatives may be equally employed. Fatty diisocyanates may be equally employed. Fatty diisocyanates of the following general formula are also suitable:

$$\begin{array}{c} NCO \\ | \\ (CH_2)_z \\ | \\ CH_3(CH_2)_xCH(CH_2)_yNCO \end{array}$$

where x+y totals 6 to 22 and z is 0 to 2, e.g., isocyanatostearyl isocyanate.

Other suitable polyisocyanates include triphenylmethane-4,4',4''-triisocyanate; polyphenyl-polymethylene polyisocyanate of the kind which may be obtained by anilineformaldehyde condensation followed by phosgenation; perchlorinated arylpolyisocyanates; phosgenated products of arylaminealdehyde condensates; phosgenated products of arylamineketone condensates; phosgenation products of condensates of anilines alkyl-substituted on the nucleus such as tolidines, with aldehydes or ketones such as formaldehyde, acetaldehyde, butyraldehyde, acetone and methyl ethyl ketone and solutions of residual isocyanates in monomeric polyisocyanates of the type produced in the commercial production of tolylene diisocyanate, diphenyl methane diisocyanate or hexamethylene diisocyanate.

Another group of suitable polyisocyanates are so-called modified polyisocyanates, i.e., polyisocyanates containing carbodiimide groups, allophanate groups, isocyanurate groups, urea groups, amide groups, imide groups or biuret groups. Polyisocyanates suitable for modification of this way include aliphatic, cycloaliphatic, araliphatic, aromatic and heterocyclic polyisocyanates of the type described, for example, by W. Siefken in Justus Liebigs, Annalen der Chemie, 562, pages 75 to 136. Specific examples include: ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanates and mixtures of these isomers; 1-isocyanato-3,3,5-trimethyl cyclohexane (U.S. Pat. No.

3,401,190); 2,4- and 2,6-hexahydro tolylene diisocyanate and mixtures of these isomers; hexahydro-1,3- and/or 1,4-phenylene diisocyanate; perhydro-2,4'- and/or -4,4'-diphenylmethane diisocyanate; 1,3- and 1,4-phenylene diisocyanate; 2,4- and 2,6-tolylene diisocyanate and mixtures of these isomers; diphenyl methane-2,4'- and-/or -4,4'-diisocyanate; naphthylene-1,5-diisocyanate; triphenyl methane-4,4', 4''-triisocyanate; polyphenyl-polymethylene-polyisocyanate of the type obtained by condensing aniline with formaldehyde, followed by phogenation and described in British patent Nos. 874,430 and 848,671; and perchlorinated aryl polyisocyanates of the type described in U.S. Pat. No. 3,277,138.

Polyisocyanates of this type are modified in well known manners either thermally and/or catalytically by air, water, urethanes, alcohols, amides, amines, carboxylic acids or carboxylic acid anhydrides. Monofunctional low molecular weight alcohols (preferably having 1 to 12 carbon atoms, such as methanol, ethanol, n- and isopropyanol, butanol, hexanol, n-octyl alcohol and dodecyl alcohol) may also be used as modifying agents, providing the urethane groups formed are converted into allophanate groups by further reactions with isocyanate present and providing the functionality of the resulting modified polyisocyanate is not reduced to an undesirable extent in this way. The modifying agent should be used in small quantities of less than 10% by weight, based on the polyisocyanate.

It is generally preferred to use commercially readily available polyisocyanates, e.g., tolylene-2,4- and -2,6-diisocyanate and any mixtures of these isomers which is commercially known as ("TDI"), polyphenyl-polymethyleneisocyanates obtained by aniline-formaldehyde condensation, followed by phosgenation which is commercially known as ("crude TDI"), and polyisocyanates which contain carbodiimide groups, urethane groups, allophanate groups, isocyanurate groups, urea groups, imide groups or biuret groups ("modified polyisocyanate").

Any suitable polyhydroxyl compound may be used according to the invention. It is preferred to use organic polyhydroxyl compounds which contain from 2 to 8 hydroxyl groups, e.g., polyhydric alcohols, polyesters, polyethers, polythioethers, polyacetals, polycarbonates or polyester amides containing at least 2, generally from 2 to 8, but preferably from 2 to 4, hydroxyl groups, of the kind known for producing homogenous and cellular polyurethanes.

Suitable polyhydric alcohols include, but are not limited to, ethylene glycol; propylene 1,2- and -1,3-glycol; butylene-1,4- and -2,3-glycol; hexane-1,6-diol; octane 1,8-diol; neopentyl glycol; cyclohexanedimethanol-(1,4-bishydroxymethylcyclohexane); 2-methyl-propane-1,3-diol; glycerol; trimethylol propane; hexane-1,2,6-triol; butane-1,2,4-triol; trimethylol ethane; pentaerythritol; quinitol; mannitol and sorbitol; methyl-glycoside; diethylene glycol; triethylene glycol; tetraethylene glycol; polyethylene glycols; dipropylene glycol; dibutylene glycol and polybutylene glycols.

Suitable hyroxyl group-containing polyesters may be, for example, reaction products of polyhydric alcohols, preferably dihydric alcohols, with the optional addition of trihydric alcohols, and polybasic, preferably dibasic carboxylic acids. The listed polyhydric alcohols may be reacted with polycarboxylic acid to produce polyester polymer containing hydroxyl groups. Instead of the free polycarboxylic acids, the corresponding polycarboxylic acid esters of lower alcohols or polycarboxylic acid anhydrides or their mixtures may be used for preparing the polyesters. The polycarboxylic acids may be aliphatic, cycloaliphatic, aromatic and/or heterocyclic and may be substituted, e.g., with halogen atoms, and may be unsaturated. Examples include: succinic acid, adipic cid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, optionally mixed with monomeric fatty acids, dimethylterephthalate and bis-glycol terephthalate.

Suitable polyethers with at least 2, generally from 2 to 8, and preferably 2 to 4, hydroxyl groups may be used according to the invention and may be prepared, e.g., by the polymerization of epoxides such as ethylene oxide, propylene oxide, butylene oxide, tetrahydrofuran, styrene oxide, trichlorobutylene oxide or epichlorohydrin, each with itself, e.g., in the presence of $BF_3$, or by addition of these epoxides, optionally as mixtures of successively, to starting components which contain reactive hydrogen atoms such as alcohols or amines, e.g., water, ethylene glycol, propylene-1,3- and -1,2-glycol, trimethylolpropane, 4,4'-dihydroxydiphenyl-propane, aniline, ammonia, ethanolamine or ethylenediamine. Sucrose polyethers such as those described, e.g., in German Auslegeschriften, Nos. 1,176,358 and 1,064,938, may also be used according to this invention. Polyethers modified with vinyl polymers such as those which may be obtained by polymerizing styrene or acrylonitrile in the presence of polyethers, (U.S. Pat. Nos. 3,383,351; 3,304,273; 3,523,093 and 3,110,695) and polybutadienes which contain OH groups are also suitable.

Suitable polyacetals may be obtained from glycols, e.g., diethylene glycol, triethylene glycol, 4,4'-dihydroxydiphenyldimethylmethane, hexandiol, and formaldehyde. Polyacetals suitable for the invention may also be prepared by the polymerization of cyclic acetals.

Suitable polycarbonates with hydroxyl groups may be of the kind, e.g., those which may be prepared by reacting diols, e.g., propane-1,3-diol; butane-1,4-diol and/or hexane-1,6-diol or diethylene glycol, triethylene glycol or tetraethylene glycol, with diarylcarbonates, e.g., diphenylcarbonate or phosgene.

Suitable polythioethers are the condensation products of thiodiglycol with itself and/or with other glycols, dicarboxylic acids, formaldehyde, aminocarboxylic acids or amino alcohols.

Suitable polyester amides and polyamides include, e.g., the predominantly linear condensates obtained from polyvalent saturated and unsaturated carboxylic acids or their anhydrides and polyvalent saturated and unsaturated amino alcohols, diamine, polyamines and mixtures thereof.

Suitable polyhydroxyl compounds which already contain urethane, modified or unmodified natural polyols, e.g., castor oil, carbohydrates and starches may be used in this invention. Additional products of alkylene oxides with phenolformaldehyde resins or with urea-formaldehyde resins are also suitable for the purpose of the invention.

Other compounds which contain at least 2 hydrogen atoms capable of reacting with isocyanates may be used in this invention in place of polyhydroxyl compound or with polyhydroxyl compounds such as compounds containing amino groups, thiol groups or carboxyl groups.

Examples of these compounds which are to be used according to the invention have been described, e.g., in High Polymers, Volume XVI, "Polyurethane, Chemistry and Technology", published by Saunders-Frisch, Interscience and Publishers, New York, London, Volume I, 1962, pages 32 and 42 and pages 44 to 54; and Volume II, 1964, pages 5 to 6 and 198 to 199; and in Kunststoff-Handbuch, Volume VII, Vieweg-Hochtlen, Carl-Hanswer-Verlag, Munich, 1966, on pages 45 to 71.

Water-binding components which may be used, according to the invention include organic or inorganic water-binding substances which have, first, the ability to chemically combine, preferably irreversibly, with water and, second the ability to reinforce the organic-inorganic end products of the invention; hold the water chemically bound until water is released and extinguishes the fire. The term "water-binding component" is used herein to identify a material, preferably granular or particulate, which is sufficiently anhydrous to be capable of absorbing water to form a solid or gel such as mortar or hydraulic cement. This compound may be a mineral or chemical compound which is anhydrous, such as CaO and CaSO4, but may exist as a partial hydrate. Water-binding components used are inorganic materials such as hydraulic cements, synthetic anhydrite with silica or burnt lime with silica.

Suitable hydraulic cements are, in particular, Portland cement, quick-setting cement, blast-furnace Portland cement, mild-burnt cement, sulphate-resistant cement, brick cement, natural cement, lime cement, gypsum cement, pozzolan cement and calcium sulphate cement. In general, any mixture of fine ground lime, alumina and silica that will set to a hard product by admixture of water and which combines chemically with the other ingredients to form a hydrate may be used. The most preferred forms of water-binding agents to be used according to the invention are those materials which are normally known as cement. In other words, they are a normally powdered material with which water normally forms a paste which hardens slowly and may be used to bind intermixed crushed rock or gravel and sand into rockhard concrete. There are so many different kinds of cement which can be used in the production of the compositions of the invention and they are so well known that a detailed description of cement will not be given here; however, one can find such a detailed description in Encyclopedia of Chemical Technology, Volume 4, Second Edition, Published by Kirk-Othmer, pages 684 to 710, as well as in other well known references in this field. In particular, pages 685 to 697 of the aforementioned Volume 4, Second Edition of Kirk-Othmer's Encyclopedia, containing a detailed disclosure of the types of cement which may be used in the production of the compositions of this invention, are incorporated herein by reference.

The ratio of the essential components which lead to the production of the polyurethane silicate foams and solid of the invention may vary, broadly speaking, within the following ranges as follows:

(a) 100 to 200 parts by weight of an emulsion of poly (alkali metal-polymerable unsaturated compound-epoxide compound) copolymer;

(b) 50 to 200 parts by weight of an organic polioisocyanate or polyisothiocyanate;

(c) up to 150 parts by weight of a polyhydroxyl compound (polyol);

(d) up to 300 parts by weight of a water-binding compound;

(e) up to 20% by weight, based on the reaction mixture, of an emulsifying agent, percentage based on the reaction mixture;

(f) up to 50% by weight of a blowing agent, percentage based on the reaction mixture;

(g) up to 20% by weight of a foam stabilizer, percentage based on the reaction mixture;

(h) up to 10% by weight of an isocyanate initiator (catalyst) percentage based on the reaction mixture;

(i) up to 50% by weight of a filler, percentage based on the reaction mixture.

The components may be reacted at any suitable temperature or pressure to produce polyurethane silicate products. The components are preferably mixed at room temperature and pressure, though any suitable temperature in range of $-20°$ C. to $80°$ C. may be employed. The chemical reaction is usually exothermic, and the temperature of the mixture is usually elevated above $30°$ C.

To increase the expanded volume of the foams produced by the process according to the invention, expanding or blowing agents may be used. Any suitable blowing agent may be used, including, for example, inert liquids boiling at temperatures of from $-25°$ C. to $50°$ C. The blowing agents preferably have boiling points of from $-15°$ C. to $+40°$ C. Particularly suitable blowing agents are alkanes, alkenes, halogen-substituted alkanes and alkenes or dialkyl ethers such as, for example, saturated or unsaturated hydrocarbons with 4 to 5 carbon atoms such as isobutylene, butane, pentane, petroleum ether, halogenated saturated or unsaturated hydrocarbons such as chlorlmethyl, methylene chloride, fluorotrichloromethane, difluorodichloromethane, trifluorochloromethane, chloroethane, trichlorofluoromethane, and $C_4$-hydrocarbons such as butane, for example, which have proved to be the most suitable. Any suitable highly volatile inorganic and/or organic substances may be used as a blowing agent, including those listed above. Additional suitable blowing agents are, for example, acetone, ethyl acetate, methanol, ethanol, hexane or diethylether. Foaming can be increased by adding compounds which decompose at temperatures above room temperature to liberate gases such as nitrogen, for example, azo compounds such as azoisobutyric and nitrile. Other examples of blowing agents are included, for example, in Kunststoff Handbuch, Volume VII, published by Vieweg and Hochtlen, Carl-Hanser-Verlag, Munich 1966, e.g., on pages 108 and 109, 445 to 453 and 507 to 510. Fine metal powders such as powdered calcium, magnesium, aluminum or zinc may also be used as blowing agents when an alkali metal silicate is added to the water by the evolving hydrogen.

The blowing agents may be used in quantities of from up to 50% by weight and preferably in quantities of from 2 to 10% by weight, based on the reaction mixture. The blowing agent is added simultaneously with the components.

Inert gases, especially air, may be used as the blowing agent. For example, one of the liquid components can be prefoamed with air and then mixed with the other components. The components can also be mixed by means of compressed air so that foam is directly formed, subsequently hardening in molds.

Other substances such as the emulsifiers, activators and foam stabilizers normally used in the production of polyurethane foams can also be added; however, they are generally not necessary. Silanes, polysiloxanes, polyether polysiloxanes or silyl-modified isocyanates may be used as foam stabilizers. Examples of foam stabilizers are disclosed in U.S. Pat. No. 3,201,372 at column 3, line 46 to column 4, line 5 and may be added in an amount up to 20% by weight, percentage based on the reaction mixture.

Activators (catalysts) may optionally be used in the process according to the invention. The activators used may be known, per se, e.g., tertiary amines such as triethylamine; tributylamine; triethylenediamine; N-methyl-morpholine; N-ethyl-morpholine; N-cocomorpholine; N,N,N',N'-tetramethylethylenediamine; 1,4-diaza-bicyclo-(2,2,2)-octaine; N-methyl-N'-dimethylaminoethylpiperazine; N,N-benzylamine; bis-(N,N-diethylaminoethyl)-adipate; N,N-diethyl benzylamine; pentamethyl diethylenetriamine; N,N-dimethyl cyclohexalamine; N,N,N',N'-tetramethyl-1,3-butanediamine; N,N-dimethyl-phenyl ethylamine; 1,2-dimethyl imidazole; 2-methyl imidazole; hexahydrotriazine derivatives; triethanolamine; triisopropanolaimine; N-methyl-diethanolamine; N-ethyl-diethanolamine; N,N-dimethyl-ethanolamine; and tertiary amine reaction products with alkylene oxides such as propylene oxide and/or ethylene oxide.

Silaamines with carbon-silicon bonds may also be used as catalysts, e.g., those described in German Patent No. 1,229,290, for example, 2,2,4-trimethyl-2-silamorpholine or 1,3-diethylamineomethyl-tetramethyldisiloxane.

Bases which contain nitrogen such as tetraalkyl ammonium hydroxides, alkali metal hydroxides such as sodium hydroxide, alkali metal phenolates such as sodium phenolate or alkali metal alcoholates such as sodium methylate may also be used as a catalyst. Hexahydrotriazines are also suitable catalysts.

Organic metal compounds may also be used as catalysts according to the invention, especially organic tin compounds. The organic tin compounds used are preferably tin salts of carboxylic acids such as tin acetate, tin octoate, tin ethyl hexoate and tin laurate and the dialkyl tin salts of carboxylic acid such as dibutyl tin diacetate, dibutyl tin dilaurate, dibutyl tin maleate or dioctyl tin diacetate.

Other examples of activators which may be used according to the invention and details of the activators (catalysts) may be found in Kunststoff-Handbuch, Volume VII, published by Vieweg and Hochtlen, Carl-Hanser-Verlag, Munich 1966, e.g., on pages 96 to 102.

The activator is generally used in a quantity of up to 10% by weight, based on the reactants in the mixture, and is added simultaneously with the other components.

Particularly high quality products are obtained by the process according to the invention when the temperature is between 20° C. and about 100° C. When an alkali metal silicate is used with water as the curing agent, the temperature is elevated by the heat produced by the chemical reaction of NCO-groups and alkali silicate solutions. This results in the formation of materials which, on the one hand, are hard as stone, but which, on the other hand, are highly elastic and, hence, highly resistant to impact and breakage.

If the quantity of heat which is liberated during the reaction between the components is not sufficient to obtain optimum properties, mixing can readily be carried out at elevated temperatures, for example, at temperature of from 30° C. to 100° C. In special cases, mixing can also be carried out under pressure at temperatures above 100° C. up to about 150° C. in a closed container so that expansion occurs, accompanied by foam formation, as the material issues from the container.

Generally, production of the foams in accordance with the invention is carried out by simultaneously mixing the components in any suitable mixer, in a batch-type or continuous mixer, and by allowing the resulting mixture to foam and harden in molds or on suitable substrates, generally outside the mixture. Then after the mixture containing water-binding agent has expanded and hardened in the mold, water may be added to the expanded foam by any suitable method, e.g., by spraying with water, by steaming, by soaking the foam in water, etc. The water is absorbed by the foam and reacts with the unreacted water-binding agent to further cure the excess water-binding agent in the cellular solid product. The necessary reaction temperature, amounting to between preferably about 0° C. and 200° C. and most preferably to between 20° C. and 130° C., can either be achieved by preheating one or more reaction components before the mixing process or by heating the mixer itself or by heating the reaction mixture prepared after mixing. Combinations of these or other procedures for adjusting the reaction temperature are, of course, also suitable. In most cases, sufficient heat is generated during the reaction itself so that after the beginning of the reaction or foaming, the reaction temperature can rise to levels of about 100° C.

For any given recipe, the properties of the resulting foams, for example, their moist density, is governed to some extent by the parameters of the mixing process, for example, the shape and rotational speed of the stirrer, the shape of the mixing chamber, etc., and also by the reaction temperature selected. The foams can have closed or open cells although, in most cases, they are largely made up of closed cells. Densities may be quite varied, but densities of 0.01 and 0.8 q/cc are preferred.

In cases of high amounts of inorganic material, these foams combine good flame resistance, insulating properties and low cost of the starting materials.

The process according to the invention provides a number of potential utilities as either porous or homogenous materials and, accordingly, a few fields of application are outlined by way of the examples which follow.

The reaction mixture, with or without a blowing agent, can be coated for example, onto any given warm, cold or even IR- or HF-irradiated substrates, or after passing through the mixer, can be sprayed with compressed air or even by the airless process onto these substrates on which it can foam and harden to give a filling or insulating coat. This type of application may be used for plastering the exterior or interior of a building or residence with polyurethane silicate concrete to provide an insulating plaster which is relatively low in cost, has good flame resistance, good insulating properties and may be color coated or water-proof coated.

The foaming reaction mixture can also be molded, cast or injection-molded in cold or heated molds and allowed to harden in these molds, whether relief or solid or hollow molds, if desired by centrifugal casting at room temperature of up to 200° C. or, if desired, under pressure. In this respect, it is quite possible to use strengthened elements, whether in the form of inorganic and/or organic or metallic wires, fibers, webs, foams, woven fabrics, skeletons, etc. This can be done, for example, by the fiber-mat impregnating process or by processes in which reaction mixtures and strengthening fibers are applied together to the mold; for example, by means of a spray unit. The moldings obtainable in this way can be used as structural elements, for example, in the form of optionally foamed sandwich elements produced either directly or subsequently by lamination with metal, glass, plastics, etc., in which case the favorable flame behavior of the foams in their moist or dry form is of particular advantage; however, they can also be used as hollow bodies, for example, as containers for products that may have to be kept moist or cool, active substances, as decorative elements, as parts of furniture and as cavity fillings. The may be used in the field of pattern and mold design, and also in the production of molds for casting metals.

In one preferred procedure, the components containing a hydraulic cement are mixed in a mixing chamber, then pumped to a mold such as a concrete block mold, and the mixture expands and hardens. The foamed block is removed from the mold.

The foams obtainable in this way can be used as insulating materials, cavity fillings, packaging materials, building materials with outstanding resistance to solvents and favorable flame behavior. The foams can also be used as lightweight walls, bricks, blocks, roof shingles or in the form of sandwich elements, for example, with metal, plastic or wood covering layers, in houses, vehicles and aircraft construction.

It is also possible to introduce into the foaming reaction mixtures, providing they are still free-flowing, organic and/or inorganic foamable or already foamed particles such as expanded clay, expanded glass, wood, popcorn, cork, hollow beads of plastics like vinyl chloride polymers, polyethylene, styrene polymers or foam particles thereof or even, for example, polysulphone, polyepoxide, polyurethane, ureaformaldehyde, phenol formaldehyde, polyimide polymers. The reaction mixtures may be allowed to foam through interstitial spaces in packed volumes of these particles so as to produce insulating materials which are distinguished by excellent flame behavior. Combination of expanded clay, glass or slate with the reaction mixture, according to the invention, is especially preferred.

The foaming mixture containing hydraulic cement may be sprayed in place of stucco on houses to provide insulation. It may be used in construction, engineering, road building, for erecting walls, igloos, seals for filing joints, plastering, flooring, insulation, decoration and as a coating, screen and covering material. The foam can also be used as an adhesive, as mortar or as casting compositions, optionally filled with inorganic or organic fillers.

Auxillaries which may, if desired, be used in, or subsequently introduced into, the reaction mixture, such as emulsifiers, surfactants, dispersants, odorants or hydrophobizing substances, enable the property spectrum of the foams in either their moist or their dry form to be modified as required.

The cellular solid products obtained in accordance with the process of this invention may be molded. The molds may be made of materials including inorganic and/or organic foamed or unfoamed, materials such as metals, for example, iron, nickel, fine steel, lacquered or teflon-coated aluminum, procelain, glass, wood, plastics such as PVC, polyethylene, epoxide resins, ABS, polycarbonate, etc. The foams obtainable by the invention can be surface-treated or, where they are in the form of substantially permeable structures such as open-cell foams or porous materials, can even be treated by centrifuging vacuum treatment. Similarly, the dry molded products can also be after-treated by rinsing or impregnating with aqueous or non-aqueous acid, neutral or basic liquids or gases such as inorganic or organic acids, ammonia, amines, organic or inorganic salt solutions, lacquer solutions, solutions of polymerizable or already polymerized monomers, dye solutions, galvanizing baths, solutions of catalysts or catalyst preliminary stages, odorants and the like.

The cellular solid products produced by the invention can be subsequently lacquered, metallized, coated, laminated, galvanized, subjected to vapor deposition, bonded or flocked in their moist or dry form or in impregnated form. The cellular solid products can be further processed for example, by sawing, milling, drilling, planing, polishing and other machining techniques. The cellular solid products may be modified in their properties by thermal after-treatment, oxidation processes, hot-pressing, sintering processes or surface melting or other consolidation processes.

The new cellular solid products are particularly suitable for use as structural materials because they show tensile and compressive strength, are tough, rigid and, at the same time, elastic. They show high permanent dimensional stability when hot, are substantially non-inflammable, and have excellent heat-insulating and sound-insulating properties. High quality, lightweight structural panels and complicated moldings may be made, optionally under pressure, from the products of this invention. It is also possible, by adopting a suitable procedure, to produce molding with an impervious outer skin. When a technique of foaming in the mold under pressure is employed, molded parts with dense marginal zones and completely non-porous, smooth surfaces are obtained.

Fillers in the form of particulate or powdered materials can be additionally incorporated into the mixtures of organic polyisocyanates and poly(alkali metal silicate-polymerable unsaturated organic compounds) copolymers for a number of applications.

Suitable fillers include solid inorganic or organic substances, for example, in the form of powders, granulates, wire fibers, dumb-bells, crystallites, spirals, rods, beads, hollow beads, foam particles, webs, pieces of woven fabric, knot fabrics, ribbons, pieces of film, etc., for example, of dolomite, sand, crushed rocks, chalk, alumina, asbestos, iron oxide, aluminum oxide and oxide hydrates, zeolites, basalt wool or powder, glass fibers, C-fibers, graphite, carbon black, Al-, Fe-, Cu-, Ag-powder, molybdenum sulphite, steel wool, bronze or copper cloth, silicon powder, expanded clay particles, hollow glass beads, glass powder, lava and pumice particles, wood chips, sawdust, cork, cotton, straw, jute, sisal, hemp, flax, rayon, popcorn, coke, particles of filled or unfilled, foamed or unfoamed, stretched or unstretched organic polymers, including plastics and rubber waste. Of the numbers of suitable organic polymers, the following, which can be present in the form of foam particles, granulate, powder, hollow beads, beads, foamable or unfoamed particles, fibers, ribbons, woven fabrics, webs, etc., are mentioned purely by way of example: polystyrene, polyethylene, polypropylene, polyacrylonitrile, polybutadiene, polyisoprene, polytetrafluoroethylene, aliphatic and aromatic polyesters, melamine-urea or phenol resins, polyacetal resins, polyepoxides, polyhydantoins, polyureas, polyethers, polyurethanes, polyimides, polyamides, polysulphones, polycarbonates, and, of course, any copolymer as well. Inorganic fillers are preferred.

Generally, the composite materials according to the invention can be filled with considerable quantities of fillers without losing their valuable property spectrum. The amount of fillers can exceed the amount of the components. In special cases, the inorganic-organic components of the present invention act as a binder for such fillers.

A high-boiling aromatic ester plasticizer such as a benzoate or phthalate ester, or polyester benzoate, e.g., dipropylene glycol benzoate, dodecyl phthalate or propylene glycol phthalate, may be added in certain applications to the polyisocyanate or poly(alkali metal silicate-polymerable organic compound-epoxide) copolymer in an amount up to 50% by weight, based on the polyisocyanate or poly(alkali metal silicate-polymerable organic compound-epoxide) copolymer depending on which the plasticizer is added to.

A resin extender may be added, in certain applications, (in an amount up to 50% by weight) to the polyisocyanate such as coal tar, e.g., Allied Chemical 439 oil, a high-boiling coal tar distillate having a Brookfield viscosity at 160° F. of 14 to 33 c.p., mineral oil and poly-alphamethyl styrene, e.g., Dow Resin 276-V2. Other types of polymer may also be added to the polyisocyanate.

DESCRIPTION OF PREFERRED EMBODIMENTS

My invention will be illustrated in greater detail by the specific examples which follow, it being understood that these preferred embodiments are illustrative of, but not limited to, procedures which may be used in the production of alkali metal silicate organic plastic products. Parts and percentages are by weight unless otherwise indicated.

EXAMPLE 1

Sodium metasilicate pentahydrate is melted to produce an aqueous solution of sodium metasilicate, then mixed with an equal amount by weight of an equal mixture of propylene oxide and styrene; then 5% by weight of adipic acid, percentage based on weight of sodium metasilicate are added and thoroughly mixed thereby producing a stable emulsion of styrene and propylene oxide in the aqueous solution of sodium metasilicate. About 0.1% by weight of benzoyl peroxide percentage based on weight of reactant and about 0.05% cobalt naphthenate is thoroughly mixed in the emulsion. The mixture is polymerized in 1 to 24 hours to produce an emulsion of poly(sodium silicate-styrene-propylene oxide) copolymer.

The emulsion may be diluted with water or dilute sodium hydroxide solution to obtain the desired viscosity, the desired color pigment added, then painted on new or cured concrete floor, stairs or blocks for a coating agent to improve water resistance and for decoration.

EXAMPLE 2

About 30 parts by weight of an aqueous sodium silicate solution containing 14.7% $Na_2O$ and 29.4% $SiO_2$ by weight, 20 parts by weight of styrene, 5 parts by weight of propylene oxide, 0.5 parts by weight of the sodium salt of ricinoleic sulphonates and 1 part by weight of benzoic acid are thoroughly mixed and emulsified; then 0.1 part by weight of potassium persulfate, 0.01 part by weight of ferric sulfate and 0.1 part by weight of benzoyl peroxide is added to the emulsion and thoroughly mixed at ambient temperature (24° C.) and pressure. The mixture is polymerized in 1 to 24 hours thereby producing a poly(sodium silicate-styrene-propylene oxide) copolymer emulsion.

EXAMPLE 3

Poly(sodium silicate-vinyl acetate-propylene oxide) copolymer emulsion is produced by mixing and reacting the following components for 1 to 24 hours:
(1) 30 parts by weight of an aqueous sodium silicate solution containing 19.7% $Na_2O$ and 31.5% $SiO_2$ by weight;
(2) 15 parts by weight of vinyl acetate;
(3) 10 parts by weight of propylene oxide;
(4) 0.2 parts by weight of p-menthane hyperperoxide, 0.02 parts by weight of cupric sulfate and 0.8 parts by weight of testdodecyl mercaptan.

The emulsion is diluted with a dilute aqueous sodium hydroxide solution until the desired viscosity is obtained then used as a binder by mixing with cellulose fibers. The wet cellulose fibers are placed on a small sheet-making machine thereby producing handsheets which are then fired at about 160° F.

EXAMPLE 4

About 30 parts by weight of an aqueous sodium silicate solution containing 18% $Na_2O$ and 36% $SiO_2$ by weight, 10 parts by weight of acrylonitrile, 10 parts by weight of propylene oxide, 1 part by weight of glyceral, 1 part by weight of para aminobenzoic acid, 0.01 part by weight of ferric sulfate are thoroughly mixed thereby producing a stable emulsion. The mixture is reacted at ambient temperature and pressure for 1 to 24 hours thereby producing a poly(sodium silicate-acrylonitrile-propylene oxide) copolymer emulsion.

EXAMPLE 5

About 50 parts by weight of an aqueous sodium silicate solution containing about 10% $Na_2O$ and 25% $SiO_2$ by weight, 25 parts by weight of methyl methacrylate, 10 parts by weight of propylene oxide, 2 parts by weight of phthalic anhydride, 5 parts by weight of sodium hydroxide and 0.5 parts by weight of benzoyl peroxide are thoroughly mixed thereby producing an emulsion. The mixture is reacted at ambient temperature and pressure for 1 to 24 hours thereby producing a poly(sodium silicate-methyl methacrylate-propylene oxide) copolymer emulsion.

Other acrylate compounds may be used in place of methyl methacrylate such as methylacrylate, ethyl acrylate, propylacrylate, butyl acrylate, pendecyl acrylate, hyxodecyl acrylate, benzyl acrylate, cyclohexyl acrylate, phenyl ethyl acrylate, ethyl methacrylate, methylα-chloroacrylate, 2-chloroethyl acrylate, 1,1-dihydroperfluorobutyl acrylate, lauryl acrylate, cyclohexylcyclohexyl methacrylate, methacrylate, allyl methacrylate, ethylene methacrylate, n-butyl methacrylate and the like and mixtures thereof.

The emulsion may be used as an adhesive by applying to two pieces of boards then placing them together to dry.

EXAMPLE 6

About 50 parts by weight of an aqueous sodium silicate solution containing about 10% $Na_2O$ and 20% $SiO_2$ by weight, 40 parts by weight of isoprene, 5 parts by weight of propylene oxide, 2 parts by weight of adipic acid, 0.5 parts by weight of potassium persulfate and 0.01 part by weight of ferric sulfate are thoroughly mixed thereby producing a stable emulsion. The mixture is reacted at a temperature and pressure to keep the temperature just below the boiling temperature of isoprene for 1 to 24 hours thereby producing a poly (sodium silicate-isoprene propylene oxide) copolymer emulsion.

Other organic dienes may be used in place of isoprene such as chloroprene, butadiene and mixtures thereof, at a temperature and pressure where the organic diene is in a liquid state.

The emulsion may be used in construction as a caulking compound around windows and doors.

EXAMPLE 7

About 50 parts by weight of an aqueous sodium silicate solution containing 12.45% $Na_2O$ and 32.1% $SiO_2$ by weight, 20 parts by weight of vinyl pyrrolidone, 15 parts by weight of propylene oxide, 0.05 parts by weight of hydrogen peroxide (aqueous solution containing about 30% $H_2O_2$), 0.01 part by weight of cupric sulfate and 1 part by weight of acetic acid are thoroughly mixed thereby producing an emulsion. The mixture is polymerized in 1 to 24 hours thereby producing a poly(sodium silicate-vinyl pyrrolidone-propylene oxide) copolymer emulsion.

EXAMPLE 8

About 50 parts by weight of an aqueous potassium silicate solution containing about 10% $K_2O$ and 15% $SiO_2$ by weight, 10 parts by weight of allyl chloride, 20 parts by weight of propylene oxide, 2 parts by weight of adipic acid, 1 part by weight of calcium salt of stearic acid, 0.05 parts by weight of potassium persulfate and 2 parts by weight of adipic acid are thoroughly mixed at ambient temperature and pressure thereby producing a stable emulsion. The mixture is polymerized in 1 to 24 hours thereby producing a poly(potassium silicate-allyl chloride-propylene oxide) copolymer emulsion.

The emulsion may be used as an adhesive for glueing paper together or may be reacted with organic diisocyanates to produce foam for insulation.

Other allyl halide compounds may be used in place of allyl chloride such as allyl bromide, methallyl chloride, methallyl bromide, and the like.

EXAMPLE 9

About 50 parts by weight of an aqueous sodium silicate solution containing about 10% $Na_2O$ and 15% $SiO_2$ by weight, 0.05 parts by weight of potassium persulfate, 0.1 part by weight of calcium octanoate, 0.2 parts by weight of lithium stearate and 2 parts by weight of adipic acid is added to a 2 quart capacity reactor equipped with a stirrer and a pressure gauge. The closed reaction was swept free of air with a nitrogen purge. About 30 parts by weight of vinyl chloride monomer and 10 parts by weight of ethylene oxide was slowly added to the reactor while agitating at about 50° C. and at a pressure between 7 to 8 kg per $cm^2$ for about 12 hours thereby producing a poly(sodium silicate-vinyl chloride-ethylene oxide) copolymer emulsion.

EXAMPLE 10

About 50 parts by weight of an aqueous sodium silicate solution containing about 15% $Na_2O$ and 25% $SiO_2$ by weight, 10 parts by weight of propylene oxide, 2 parts by weight of adipic acid, 0.2 parts by weight of sodium stearate and 0.1 part by weight of benzoyl peroxide are mixed then added to an autoclave and a temperature of about 50° C. is maintained at a pressure between 7.0 and 7.1 kg per $cm^2$. Vinyl chloride monomer is slowly added while agitating over a period of 7 to 10 hours until the emulsion contains about 30% vinyl chloride polymerized with the sodium silicate and propylene oxide thereby producing an emulsion of poly(sodium silicate-vinyl chloride-propylene oxide) copolymer.

The emulsion may be applied to paper and used as an adhesive or used as a coating agent for wood.

EXAMPLE 11

About 50 parts by weight of an aqueous sodium silicate solution containing about 14.7% $Na_2O$ and 29.4% $SiO_2$ by weight, 2 parts by weight of para-aminobenzoic acid, 0.5 parts by weight of sodium lauryl sulphate, 0.05 parts by weight acetyl peroxide, 0.05 parts by weight of benzoyl peroxide, 10 parts by weight of propylene oxide, 2 parts by weight of surcose, and 30 parts by weight of vinylidene chloride are mixed thoroughly thereby forming a stable emulsion. The mixture is polymerized in 1 to 24 hours thereby producing a poly(sodium silicate-vinylidene chloride-propylene oxide) copolymer emulsion.

Other vinyl monomers may be used in place of vinylidene chloride such as divinyl benzenes, n-vinyl carbazole, arylvinyl ketones, alkyl vinyl ketones, vinyl pyridines, vinyl pyrrolidone, vinyl acetate, acrylonitrile, methacrylonitrile, styrene, methacrylate and mixtures thereof.

Other organic epoxide compounds may be used in place of propylene oxide such as, styrene oxide, epichlorohydrin, butylene oxide, tetrahydrofuran, trichlorobutylene oxide and the like.

EXAMPLE 12

About 50 parts by weight of an aqueous sodium silicate solution containing about 13% $Na_2O$ and 25% $SiO_2$ by weight, 2 parts by weight of phthalic anhydride, 10 parts by weight of acrylonitrile, 5 parts by weight methallyl chloride, 10 parts by weight of propylene oxide, 0.5 parts by weight of potassium fatty acid soap, 0.05 parts by weight of potassium persulfate, 0.05 parts by weight of benzoyl peroxide and 0.01 parts by weight of cupric sulfate are thoroughly mixed thereby forming a stable emulsion. The mixture is occasionally agitated at ambient temperature and pressure and is polymerized in 1 to 24 hours thereby producing a poly(sodium silicate-methallyl chloride-acrylonitrile-propylene oxide) copolymer emulsion.

Other vinyl monomers may be used in place of acrylonitrile such as methyl methacrylate, styrene divinyl benzenes, methacrylonitrile, n-vinyl carbozole, aryl vinyl ketones, alkyl vinyl ketones, vinyl pyridines, vinyl pyrrolidone, vinyl acetate, ethylacrylate and the like.

Other allyl compound may be used in place of methallyl chloride such as allyl chloride, allyl alcohol, allyl bromide and the like.

EXAMPLE 13

About 50 parts by weight of an aqueous sodium silicate solution containing 10% by weight Na$_2$O, and 20% by weight SiO$_2$, 2 parts by weight of adipic acid, 10 parts by weight of propylene oxide, 1 part by weight sodium salt of fatty acids and a redox system containing 0.006 parts by weight of potassium persulfate and 0.1 parts by weight of dodecyl mercaptan are mixed and cooled to about −5° C. in a closed system; then 20 parts by weight of butadiene in a liquid state at about −5° C. added to the mixture and thoroughly mixed thereby producing a stable emulsion. The mixture is polymerized in 1 to 24 hours to produce an emulsion of poly(sodium silicate-butadiene-propylene oxide) copolymer.

The emulsion may be applied to two wood (board) surfaces then the wood is placed together and the emulsion acts as a strong adhesive when dried in 24 hours.

EXAMPLE 14

About 50 parts by weight of an aqueous sodium silicate solution containing about 10% Na$_2$O and 15% SiO$_2$, 1 part by weight of adipic acid, 20 parts by weight of butadiene, 5 parts by weight of propylene oxide, 0.5 parts by weight of sodium salt of fatty acids, 0.05 to 0.1 parts by weight of ferric sulfate, 0.1 parts by weight of hydrogen peroxide, 0.01 parts by weight of benzoxyl peroxide and 0.1 parts by weight of lauryl mercaptan are mixed in a closed system at ambient to 50° C. while agitating at about 0.40 to 6 psiq for 30 to 120 minutes; then the mixture is heated to 70° to 100° C. at ambient pressure for 10 to 30 minutes. The reaction is complete within 24 hours thereby producing an emulsion of poly(sodium silicate-butadiene-propylene oxide) copolymer.

The emulsion may be used as a caulking compound in construction.

EXAMPLE 15

About 60 parts by weight of an aqueous sodium silicate solution containing about 15% Na$_2$O and 20% SiO$_2$ by weight, 20 parts by weight of butadiene, 10 parts by weight of styrene, 10 parts by weight of acrylonitrile, 5 parts by weight of propylene oxide, 2 parts by weight of adipic acid, 3 parts by weight of potassium salt or fatty acids, 1 part by weight of trisodium phosphate dodecahydrate, 0.2 parts by weight of diethylenetriamine, 0.2 parts by weight of diethylenetriamine, 0.2 parts by weight of p-menthane hydroperoxide, 0.005 parts by weight of ferrous sulfate and 0.3 parts by weight of tert-dodecyl mercaptan are added to a closed system and are mixed thoroughly under 45 to 60 psiq and at 5° C. to 50° C. in a closed system, thereby producing a stable emulsion. The reaction is complete within 24 hours thereby producing an emulsion of poly(sodium silicate-butadiene-styrene-acrylonitrile-propylene oxide) copolymer.

The emulsion may be dried, then powdered, then molded by heat and pressure into useful products such as sheets, tubes, knobs, etc.

EXAMPLE 16

About 50 parts by weight of an aqueous sodium silicate solution containing about 10% by weight of Na$_2$O and 20% by weight of SiO$_2$, 10 parts by weight of isoprene, 10 parts by weight of allyl chloride, 10 parts by weight of vinylidine chloride, 5 parts by weight of propylene oxide, 2 parts by weight of sodium salt of fatty acids, 2 parts by weight of sodium salt of fatty acids, 2 parts by weight of adipic acid, 0.5 parts by weight of benzoyl peroxide and 0.01 N,N-dimethyl aniline are thoroughly mixed thereby producing a stable emulsion at ambient temperature and pressure. The reaction is complete in 1 to 24 hours thereby producing an emulsion of poly(sodium silicate-allyl chloride-isoprene-vinylidene chloride propylene oxide) copolymer.

The emulsion may be painted in wood and used as an adhesive or coating agent.

EXAMPLE 17

About 60 parts by weight of an aqueous sodium silicate solution containing about 15% by weight of Na$_2$O and 25% by weight of SiO$_2$, 5 parts by weight of chloroprene, 5 parts by weight of allyl alcohol, 5 parts by weight of vinylbenzyl alcohol, 5 parts by weight of styrene, 5 parts by weight of propylene oxide, 1 part by weight of citric acid, 1 part by weight of aminobenzoic acid, 2 parts by weight of sodium salt of fatty acids, 0.1 parts by weight of hydrogen peroxide, 0.05 parts by weight of benzoyl peroxide and 0.1 part by weight of azo-bisisobutyronitrile, are thoroughly mixed in a closed system thereby producing a stable emulsion. The emulsion is heated to 80° to 100° C. under autogenous pressure for 1 to 24 hours thereby producing an emulsion of poly(sodium silicate-unsaturated organic compound-propylene oxide) copolymer.

The emulsion may be used as caulking material in construction to seal around doors and window.

EXAMPLE 18

About equal parts by weight of a polyisocyanate listed below and an emulsion of poly(sodium silicate-unsaturated compound-epoxide compound) copolymer as produced in the Examples listed below are thoroughly mixed at ambient temperature and pressure and reacts within 15 seconds to 5 minutes to produce a polyurethane silicate resinous product.

| EXAMPLE | Emulsion Produced in Example No. | Polyisocyanate |
| --- | --- | --- |
| a | Example 1 | polyphenyl-polymethylene-isocyanates with an isocyanate content of about 5% by weight. |
| b | Example 2 | tolylene diisocyanate |
| c | Example 3 | p,p' diphenylmethane diisocyanate |
| d | Example 4 | polyphenyl-polymethylene-isocyanates with an isocyanate content of about 23% by weight. |
| e | Example 5 | polyphenyl-polymethylene-polyisocyanate with an isocyanate content of about 2.5% by weight |
| f | Example 6 | 4,4'-phenylmethylene diisocyanate. |
| g | Example 7 | polyphenyl-polymethylene-isocyanates with an isocyanate content of about 23% by weight. |
| h | Example 8 | polyphenyl-polymethylene-isocyanates with an isocyanate content of about 15% by weight. |
| i | Example 9 | polyphenyl-polymethylene-isocyanate with an isocyanate content of about 7% by weight. |
| j | Example 10 | Tolylene diisocyanate |
| k | Example 11 | 4,4'-phenylmethylene diisocyanate. |
| l | Example 12 | isocyanate-terminated poly- |

| EXAMPLE | Emulsion Produced in Example No. | Polyisocyanate |
|---|---|---|
| m | Example 13 | ethylene (NCO content 19% by weight). polyphenyl-polymethylene-isocyanates with an isocyanate content of about 18% by weight. |
| n | Example 14 | tolylene diisocyanate |
| o | Example 15 | 4,4'-phenylmethylene diisocyanate. |
| p | Example 16 | Sulphonated polyphenyl-polymethylene-polyisocyanate. |
| q | Example 17 | Residue of tolylene diisocyanate distillation (18% by weight of NCO) |
| r | Example 18 | 25% solution of tolylene diisocyanate residue polyphenyl-polymethylene-polyisocyanate (NCO content 30%) |

EXAMPLE 19

About equal parts by weight of an isocyanate-terminated polyurethane prepolymer listed below and an emulsion of poly(sodium silicate-unsaturated compound-epoxide compound) copolymer as produced in the examples listed below are thoroughly mixed at ambient temperature and pressure. The mixture reacts within 15 seconds to 5 minutes to produce a polyurethane silicate resinous product.

| EXAMPLE | Emulsion Produced In Example No. | Isocyanate-terminated polyurethane Prepolymer |
|---|---|---|
| a | Example 1 | isocyanate-terminated polyethylene ether (NCO content 19% by weight) |
| b | Example 2 | isocyanate-terminated polypropylene ether (NCO content 22% by weight) |
| c | Example 3 | isocyanate-terminated polyester (NCO content 11% by weight) |
| d | Example 4 | isocyanate-terminated polybutadiene (NCO content 15% by weight) |
| e | Example 5 | isocyanate-terminated polyisocyanate silicate (NCO content 12% by weight) |
| f | Example 6 | isocyanate-terminated polysulfide (NCO content 15% by weight). |

EXAMPLE 20

About 50 parts by weight of a polyisocyanate listed below and 60 parts by weight of an emulsion of poly(sodium silicate-unsaturated organic compound-epoxide compound) copolymer as produced in the example listed below, 5 parts by weight of trichlorotrifluoroethane, 0.5 parts by weight of triethylenediamine, 0.001 parts by weight of tin octoate are thoroughly mixed. The mixture begins to expand in 15 to 120 seconds to 3 minutes thereby producing a foamed polyurethane resinous product.

| EXAMPLE | Emulsion Produced in Example Number | Polyisocyanate |
|---|---|---|
| a | Example 1 | polypheny-polymethylene-isocyanates with an NCO content of about 12%. |
| b | Example 2 | tolylene diisocyanate |
| c | Example 3 | 4,4'-phenylmethylene diisocyanate |
| d | Example 4 | 4,4'-phenylmethylene diisocyanate |
| e | Example 5 | sulphonated polyphenyl-polymethylene-polyisocyanate |
| f | Example 6 | residue of tolylene diisocyanate distillation (approximately 18% by weight of NCO) |
| g | Example 7 | Equal parts by weight if tolylene diisocyanate and polyphenyl-polymethylene-isocyanates with an isocyanate content of 2.5%. |

The foamed polyurethane silicate may be used to produce construction panels, lightweight building blocks, foamed on walls for insulation, door cores and as decorative items.

EXAMPLE 21

About 50 parts by weight of polyphenyl-polymethylene-isocyanates with an NCO content of about 23% by weight, 40 parts by weight of an emulsion of poly(alkali metal silicate-unsaturated compound-epoxide compound) copolymer as produced in the examples listed below, 20 parts by weight of a polyol listed below, 5 parts by weight of trichlorotrifluoroethane, 2 parts by weight of methylene chloride, 1 part by weight of a silicone surfactant (L-5740 produced by Union Carbide), 0.05 parts by weight of triethylamine and 0.005 parts by weight of tin laurate are thoroughly mixed. The mixture begins to expand in 15 seconds to 3 minutes thereby producing a foamed polyurethane silicate resinous product.

| EXAMPLE | EMULSION PRODUCED IN EXAMPLE | POLYOL |
|---|---|---|
| a | Example 1 | Ethylene glycol (mol. wt. 600) |
| b | Example 2 | Propylene glycol (mol. wt. 600) |
| c | Example 3 | Propylene glycol (mol. wt. 1200) |
| d | Example 4 | Sucrose amine polyol with a hydroxyl No. 530 and viscosity of 11,000 (cps) |
| e | Example 5 | Polyethylene triol with a hydroxyl No. 56, 2000 mol wt. |
| f | Example 6 | Phenolic based polyol, hydroxyl No. 515-545, viscosity of 20,000-25,000. |
| g | Example 7 | powdered wood |
| h | Example 8 | powdered bark |
| i | Example 9 | polybutadiene polymer containing OH groups (Poly bd R-45M produced by ARCO) |
| j | Example 10 | Polyester resin terminated in OH groups |
| k | Example 11 | polyethylene diol and mol wt. 1000. |

EXAMPLE 22

Example 21 is modified by adding about 200 parts by weight of a water-binding agent, Portland Cement to the mixture thereby producing a foamed polyurethane silicate concrete product.

Other water-binding agents may be used in place of Portland Cement such as other hydraulic cements, gypsum, burnt lime, synthetic anhydrites and mixtures thereof.

EXAMPLE 23

Example 20 is modified wherein an amount of Portland cement equal to the weight of the isocyanate-terminated polyurethane prepolymer is added to the mixture with the other components thereby producing a polyurethane silicate resinous concrete product.

Other water-binding agents may be used in place of Portland Cement such as other hydraulic cements, gypsum, burnt lime, synthetic anhydrites and mixtures thereof.

The polyurethane silicate resinous concrete may be used to produce building panels.

EXAMPLE 24

Example 14 is modified wherein 50 parts by weight of Portland Cement is added to the stable emulsion and thoroughly mixed then poured into a closed mold and within 24 hours a poly(sodium silicate butadiene-propylene oxide) copolymer reinforced concrete is produced.

EXAMPLE 25

About 50 parts by weight of the emulsion of poly(sodium silicate-allyl chloride-isoprene-vinylidene-propylene oxide) copolymer as produced in Example 17, 50 parts by weight of water, 150 parts by weight of Portland cement and 150 parts by weight of plaster's sand are thoroughly mixed then poured into a building block mold and is cured thereby producing an inorganic-organic plaster reinforced building block.

EXAMPLE 26

About 20 parts by weight of the emulsion of poly(sodium silicate-styrene-propylene oxide) copolymer as produced in Example 2, 30 parts by weight of water and 100 parts by weight of gypsum are thoroughly mixed then poured into a mold of an art object thereby producing an inorganic-organic plastic reinforced art object.

EXAMPLE 27

About 50 parts by weight of an aqueous sodium silicate containing about 10% by weight of $Na_2O$ and 15% by weight of $SiO_2$, 2 parts by weight of adipic acid, 10 parts by weight of methyl methacrylate, 5 parts by weight of propylene oxide, 1 part by weight of sodium salt of fatty acids, 3 parts by weight of sodium hydroxide, 0.1 part by weight of potassium persulfate, 0.01 part by weight of benzoyl peroxide and 0.005 parts by weight of ferric sulfate are thoroughly mixed to produce a stable emulsion then poured into a closed system then 15 parts by weight of ethylene are slowly added while agitated for 30 to 120 minutes at ambient to 60 psiq and ambient temperature. The mixture is then heated to 80° to 100° C. while agitating. The reaction is complete within 24 hours thereby producing an emulsion of poly(sodium silicate-ethylene-methyl methacrylate-propylene oxide) copolymer.

The emulsion may be painted on wood for a coating agent.

EXAMPLE 28

About 50 parts by weight of an aqueous sodium silicate solution containing about 10% $Na_2O$ and 15% $SiO_2$, 5 parts by weight of propylene oxide, 10 parts by weight of styrene, 0.5 parts by weight of potassium salt of fatty acids, 0.1 part by weight of potassium persulfate, 0.01 parts by weight of ferric sulfate, 2 parts by weight of adipic acid, and 0.01 parts by weight of benzoyl peroxide are thoroughly mixed thereby producing a stable emulsion. About 10 parts by weight of propylene are slowly added while agitating at ambient pressure to 60 psiq in a closed system at ambient temperature for 30 to 120 minutes. The mixture is then heated to 80° to 100° C. while agitating for 10 to 30 minutes. The reaction is complete within 1 to 24 hours thereby producing an emulsion of poly(sodium silicate-propylene-styrene-propylene oxide) copolymer.

The emulsion may be reacted with a polyisocyanate to produce a foamed product which may be used for sound and thermal insulation.

Although specific conditions and ingredients have been described in conjunction with the above examples of preferred embodiments these may be varied, and other reagents and additives may be used where suitable, as described above, with similar results.

Other modifications and applications of this invention will occur to those skilled in the art upon reading this disclosure. These are intended to be included within the scope of this invention, as defined in the appended claims.

I claim:

1. The process for the production of polyurethane silicate foamed products by the following steps:
    (a) mixing and reacting an aqueous alkali metal silicate solution in the amount of 100 parts by weight, a polymerable unsaturated organic compound in the amount of 5 to 100 parts by weight, a mono- or polycarboxylic acid salt forming compound in the amount of 1 to 10 parts by weight, an organic epoxide compound, selected from the group consisting of ethylene oxide, propylene oxide, epichlorohydrin and mixtures thereof, in the amount of 1 to 50 parts by weight, and a catalytic amount of an initiator, thereby
    (b) producing an alkali metal silicate-organic plastic, then
    (c) adding and reacting 5 to 100 parts by weight of a polyisocyanate or polyisothiocyanate, up to 10% by weight of a polyisocyanate initiator, up to 20% by weight of an emulsifier, up to 50% by weight of a blowing agent, and up to 20% by weight of a foam regulator, percentages based on the weight of the reaction mixture, thereby
    (d) producing a foamed polyurethane silicate product.

2. The product produced by the process of claim 1.

3. The process of claim 1 wherein the alkali metal silicate is selected from the group consisting of sodium silicate, potassium silicate and mixtures thereof.

4. The process of claim 1 wherein the acid compound is selected from the group consisting of aliphatic carboxylic acid, aliphatic polycarboxylic acid, cycloaliphatic carboxylic acid, cycloaliphatic polycarboxylic acid, heterocyclic polycarboxylic acid, aromatic polycarboxylic acid, aromatic carboxylic acid, aliphatic carboxylic acid anhydride, aromatic carboxylic acid anhydride and mixtures thereof.

5. The process of claim 1 wherein the acid compound is adipic acid.

6. The process of claim 1 wherein the initiator is selected from the group consisting of organic peroxide, inorganic peroxide, alkali metal persulfate, ammonium persulfate, a redox system.

7. The process of claim 1 wherein the polymerable unsaturated organic compound is selected from the group consisting of vinyl monomers, organic dienes, allyl compounds, unsaturated aliphatic hydrocarbon compounds and mixtures thereof.

8. The process of claim 1 wherein inorganic or organic particulates or pulverulent materials are added to the reaction mixture.

9. The process of claim 7 wherein the vinyl monomer is selected from the group consisting of acrylate compounds, styrene, vinyl acetate, vinyl chloride, vinylidine chloride, acrylonitrile, vinyl toluenes, N-vinyl carbozole, vinyl pyrovidone, vinylidine cyanide, alkyl vinyl ketones, aryl vinyl ketones, methacrylonitrile and mixtures thereof.

10. The process of claim 7 wherein the organic diene compound is selected from the group consisting of isoprene, chloroprene, butadiene and mixtures thereof.

11. The process of claim 7 wherein the allyl compound is selected from the group consisting of allyl alcohol, 3-chloropropene, 3-bromopropene, methallyl chloride and mixtures thereof.

12. The process of claim 7 wherein the unsaturated organic aliphatic hydrocarbon is selected from the group consisting of ethylene, propylene and mixtures thereof.

13. The process of claim 1 wherein the polyisocyanate is selected from the group consisting of aliphatic, cycloaliphatic, araliphatic, aromatic, heterocyclic polyisocyanates and mixtures thereof.

14. The process of claim 1 wherein the polyisocyanate is a phosgenation product of an aniline-formaldehyde condensation product.

15. The process of claim 1 wherein the polyisocyanate initiator is selected from the group consisting of tertiary amine, organic tin compound, silaamine and mixtures thereof.

16. The process of claim 1 wherein a water-binding agent selected from the group consisting of hydraulic cement, gypsum, burnt lime, synthetic anhydrate and mixtures thereof, in the amount of 1 to 300 parts by weight, is added in step (c) of claim 1, thereby producing an inorganic-organic concrete.

17. The process of claim 1 wherein 1 to 150 parts by weight of a polyol are added in step (c) of claim 1.

18. The product produced by the process of claim 16.

19. The product produced by the process of claim 17.

20. The process of claim 1 wherein an isocyanate-terminated polyurethane prepolymer is used as the polyisocyanate.

21. The product produced by the process of claim 20.

22. The process of claim 1 wherein up to 10% by weight of an epoxide starting compound which contains a reactive hydrogen atom is added in step (a) of claim 1, percentage based on the reactants of step (a).

* * * * *